2,778,099
								Patented Jan. 22, 1957

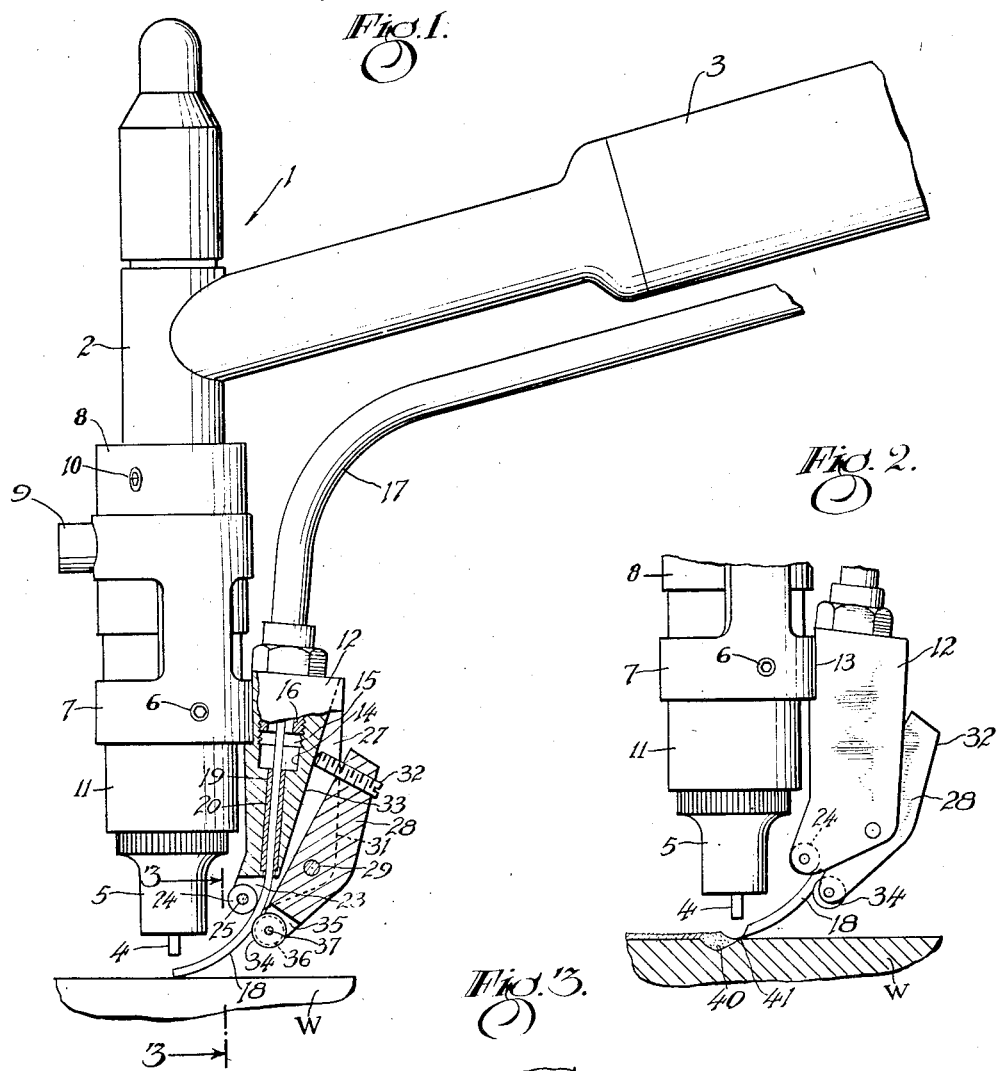

United States Patent Office

2,778,099
METHOD OF WELDING AND APPARATUS THEREFOR

Nelson E. Anderson, Berkeley Heights, and Lawrence M. Layden, New Providence, N. J., assignors to Air Reduction Company, Incorporated, New York, N. Y., a corporation of New York Application May 15, 1952, Serial No. 287,874

4 Claims. (Cl. 29—484)

This invention relates to welding apparatus of the type in which the welding heat is produced either by an electric arc or a gas flame and in which filler metal is fed to the weld during welding in either wire or rod form. More particularly the invention relates to an improvement in a means for automatically feeding filler metal wire to the welding zone such as that disclosed in Joseph M. Tyrner Patent No. 2,723,331, assigned to the same assignee as is this application, and is especially concerned with the portion of such a means which is responsible for guiding and directing a filler wire to the weld in proper relation to the weld and to the welding torch.

In the aforementioned patent, there is disclosed a welding apparatus including a welding torch and means for automatically feeding filler wire to the weld in such relation to the weld puddle that the torch is automatically propelled along the seam in a direction opposite to that in which the filler wire is fed, provided that the torch is either mounted on a freely movable carriage or, if manually supported, is merely guided by the operator to follow the seam. That application furthermore discloses an electric arc welding apparatus in which the filler wire feeding means is electrically operated and means is provided for limiting the operation of the feeding means to the periods during which actual welding operations take place. When the electric arc welding apparatus disclosed therein comprises a hand torch or electrode holder for manual welding and includes a high frequency arc-starting means, such as a high frequency oscillator, means is provided to prevent a passage of welding current through the filler wire to ground during arc starting or should the high frequency arc starting means be actuated when the torch is removed from the workpiece.

While the aforementioned apparatus is quite satisfactorily operable in most instances, we have found that the portion thereof attached to the welding apparatus for properly guiding the filler wire to the weld may be made more compact, thereby greatly increasing the utility of the welding apparatus particularly for welding seams closely adjacent to which are obstructions of one type or another. Additionally, we have discovered that the operation of the apparatus on the whole can be greatly improved by imparting to the filler wire just prior to its entrance into the welding zone a permanent bend or curvature. Thus, the permanently curved filler wire will support substantially greater weights and can, in fact, if the weight of a welding torch is not abnormally large, support quite readily the entire weight thereof. By virtue of the fact that greater force can be applied between the wire, stiffened by bending, and the work, the tractive force can be increased and the automatic propulsion of the device is greatly improved. Furthermore, the greater compactness of the means for guiding the filler wire to the weld and the increased strength imparted to the filler wire lends to the apparatus in use a greater range of angularity between the torch and the workpiece. In addition, we have found that when a permanent set or curvature is put in the wire as it is fed to the arc, this set overcomes any residual curvature or bend existing in the wire as it is drawn from the reel and thus consistent results can be obtained without the use of a wire straightening stand or specially wound wire.

The primary object of our invention is, therefore, to provide a filler wire feeding means for welding apparatus of the type described in the aforementioned Tyrner patent including means for guiding and directing the filler wire to the weld which makes the welding torch thereof more compact, such guiding means further imparting a permanent curvature to the filler wire just prior to its entrance into the weld area and greatly improving the self-propulsion and other characteristics of the torch.

We have also found that the welding apparatus can be given greater versatility by mounting our novel filler wire guide means adjustably on the torch so that it may be swivelled about the electrode holder and further may be adjusted longitudinally thereof. By reason of such adjustability the torch may be adapted for propulsion by the filler wire in a plurality of different directions and can be made to readily accommodate feeding of the filler wire to the weld with curvatures of varying radius.

Another object of our invention is, therefore, to provide an adjustable mounting for our wire guiding means to permit adjustment of it on the welding torch.

Other objects and novel features of our invention will become apparent in connection with the following more specific description of one embodiment thereof illustrated in the accompanying drawings in connection with a manually operable arc welding torch. In the drawings:

Fig. 1 is an elevation partly in section of a manually operable arc welding torch on which is mounted our novel filler wire guiding means;

Fig. 2 is a side elevation of the lower end only of the welding torch of Fig. 1 and the filler wire guide means showing the relationship between the welding torch, the work, a weld puddle, and the portion of the filler wire that is fed from its guide means into contact with the work at the forward edge of the weld puddle; and Fig. 3 is a front elevation of the lower portion only of the filler wire guide means.

By referring to Fig. 1 a manual electrode holder or welding torch is shown at 1 and has an electrode holding portion 2 and a handle portion 3. The electrode holding portion is adapted to hold an electrode, the tip of which appears at 4. The electrode may be a non-consuming one, such as a tungsten or thoriated tungsten electrode. Cooling water, an inert shielding gas such as argon or helium, and welding current may be supplied to the electrode holder through the handle portion 3 thereof as clearly described in the aforementioned patent. The shielding gas issues from a nozzle 5 in an annular stream which surrounds the tip of the electrode and shields it as well as the arc and the weld puddle in a manner well understood in the art.

A collar-like clamp 7 is adjustably mounted on member 8 of the nozzle assembly of the torch which includes nozzle 5. Member 8 screws onto the electrode-holding portion 2 of the electrode holder and the collar-like clamp 7 is secured thereto by a set screw mounted in boss 9 formed on the clamp 7. Set screws 10, only one of which is shown, are provided to secure member 8 of the nozzle assembly in fixed position on an electrode-holding portion 2 of the electrode holder, thereby preventing rotation of the nozzle assembly with respect to the electrode holder. A loosely fitting insulating member 11 is supported around the lower portion of the nozzle assembly by a number of set screws 6 (only one of which is shown) mounted in the lower portion of the collar-like clamp 7. The collar-like clamp 7, as will be readily understood, may be adjusted longitudinally of the electrode-holding portion 2 of the electrode holder by loosening the set screw in boss 9 and, if necessary, by further loosening the set screws 6. By the same means the clamp may also be adjusted rotatably with respect to portion 2 of the electrode holder.

A filler wire guide block 12 is secured as by welding or brazing at 13 to the clamp 7. A bore 14 of varying diameter extends through the guide block 12 from its upper end to its lower end. The upper portion of the bore 14 is of relatively large diameter and is threaded as at 15 to receive a coupling nipple 16 secured to the end of an insulation-covered flexible conduit 17 through which filler wire 18 is fed to the guide block. A lower portion 19 of bore 14 is of relatively smaller diameter and has inserted therein a sleeve 20 of a wear-resistant metal such as carbide-bearing metal. The filler wire 18 passes through the nipple 16 into the bore 14 and thence into the metal sleeve 20, the inner diameter of which is slightly larger than the diameter of the filler wire. The lower portion of guide block 12 is bifurcated to provide an opening 23 in which there is mounted a bending roller 24 mounted on a shaft 25 which is journaled in the arms 26 of the bifurcated lower end of the block. As may be seen in either Figs. 1 or 2, bending roll 24 is mounted in front of the lower end of bore 14 which opens into the rearward portion of opening 23.

The rearward portion of guide block 12 is also bifurcated to provide an opening 27 in which is mounted a rocker arm 28 pivotally mounted on a shaft 29 journalled in arms 31 formed by opening 27. A set screw 32 is threadedly mounted at the upper end of rocker arm 28 and is adapted to engage the bottom 33 of opening 27 to pivot the rocker arm 28 about shaft 29. A second wire bending roll 34 is mounted in an opening 35 formed by bifurcating the lower end of the rocker arm 28. The bending roll 34 is grooved as at 36 and is mounted upon a shaft 37 journaled in the arms of rocker arm 28 formed by opening 35.

The bending roll 24 which is fixedly located with respect to guide block 12 and grooved bending roll 34 which is movably mounted with respect thereto are adapted to receive between them the filler wire 18 as it emerges from the lower end of bore 14. By relatively adjusting the bending rolls 24 and 34, the filler wire may be bent beyond its elastic limit and may have imparted thereto any permanent curvature that is desired and that may be required by reason of the relative position of the bending means with respect to the tip of the electrode. This relative adjustment of the bending rolls is readily accomplished by adjusting set screw 32. The curvature imparted must be sufficient to displace any cast that may be present in the wire. Such a curvature is usually of the order of magnitude of a 1 inch radius.

The relative longitudinal position of the wire guide block itself with respect to the lower end of the electrode holding portion 2 of the electrode holder may be varied by adjustment of clamp 7 longitudinally of that portion of the electrode holder. Its angular position with respect to the axis of the electrode holding portion 2 of the electrode holder may be adjusted slightly by pivoting the clamp 7 about set screws 6 by adjustment of the set screw mounted in boss 9. Various combinations of adjustments of the supporting parts as above set forth may be employed to properly locate the wire guiding and bending means with respect to the tip of the electrode (1) to cause bending of the filler wire in a plane including the axis of the electrode, (2) to permit proper bending of the filler wire in order to obtain a desired direction of feed thereof with respect to the workpiece while at the same time providing a desired spacing of the filler wire from the tip of the electrode 4 axially of the electrode to provide a desired arc length, and (3) to permit proper bending of the filler wire in order that the angle of feed thereof with respect to the workpiece may be any that is desired. The groove 35 in bending roll 34 assures that the filler wire will be provided with a bend in but one direction.

Referring now particularly to Fig. 2, the filler wire is illustrated as being fed into a weld puddle 40. During the welding operation, the end of the filler wire is, of course, continually melted by the heat of the arc as fast as it is fed to the welding zone and merges with the molten metal in the weld puddle. The wire guiding and bending means is adjusted so that after the weld puddle has been formed the solid unmelted end portion of the filler wire contacts with a solid portion of the surface of the workpiece W adjacent the forward edge 41 of the weld puddle. This end of the filler wire continually fuses and is either bonded to or frictionally sticks to the metal of the workpiece and therefore the reaction of this portion of the filler wire against the work surface during feeding of the filler wire produces in cooperation with the feed rolls 24 and 34 and the flexible filler wire conduit 17 a propulsion effect on the welding torch which moves the torch along the work surface in a direction opposite to the direction in which the filler wire is fed. As pointed out in the aforementioned Tyrner patent, the more nearly parallel the unmelted end portion of the filler wire is to the work surface, the better will be the propulsion effect on the welding torch. It is there indicated that the filler wire should not form an angle of more than 20°, preferably not more than 10°, with the surface of the workpiece, if good propulsion is to be obtained.

The permanent cast or curvature imparted to the filler wire by the bending rolls stiffens the filler wire, whereby it has been found to be capable of readily supporting the entire weight of a normal manually operable electrode holder. By clamping the wire guide and bending means at various positions about the electrode holding portion 2 of the electrode holder, the torch may be propelled in any relative direction, though best visibility is afforded an operator if the wire bending means is located at right angles to the handle portion 3 rather than beneath the handle as shown in the accompanying drawings. It will be apparent that the rate of travel of the welding torch will depend upon the rate of feed of the filler wire and will be substantially equal to the rate of feed of the filler wire if the angle incidence is small. The practical range of filler wire feed speeds is from about 10 to 90 inches per minute, though speeds somewhat lower than the upper figure are generally employed, depending upon the type of metal being welded and the type of filler wire being used.

For welding with the electric arc welding torch illustrated, the torch is placed on the workpiece with the filler wire supporting it thereon and the high frequency starter operated to establish an arc, the end of the filler wire being trimmed initially as shown in Fig. 1, should it not already be in that condition. The operator need only maintain the torch in proper upright position and guide it along the seam as the filler wire is fed to the weld. He need support none of the weight of the torch nor need he be concerned with the spacing of the electrode tip from the workpiece once that spacing has been determined by prior adjustment of the filler wire guide and bending means. It is contemplated that the various automatic controls for feeding the filler wire, establishing and maintaining the arc, supplying the cooling water and inert gas, and preventing passage of the welding current through the filler wire, as fully disclosed in the aforementioned Tyrner patent, may be here employed.

While the invention has been described in its application to an arc welding torch with a non-consuming type electrode, it is also applicable to an arc welding torch in which the electrode may be of the consumable type and is also applicable to a gas torch such as an oxyacetylene torch in which the heat for welding is supplied by a gas flame instead of an electric arc.

Various changes may, of course, be made in the apparatus illustrated and described without departing from the scope of our invention, which is rather to be limited only to the extent set forth in the appended claims.

We claim:

1. Welding apparatus comprising a welding torch adapted to supply heat to a welding zone on a workpiece in a plane below the torch to form a weld puddle in said zone, a filler wire guide mounted on the barrel of said welding torch adjacent the heat supplying end thereof, a bore extending through said guide, a flexible conduit secured to the end of the guide remote from said end of the barrel of the torch and adapted to lead a filler wire into said bore, means for feeding a filler wire through said flexible conduit and said guide, and means supported by said guide adjacent the wire discharge end of said bore for imparting a permanent curvature to said wire as it emerges from said bore and directing the permanently curved filler wire toward the welding zone to engage the workpiece at the edge of said weld puddle, said permanent curvature of said filler wire conditioning the wire to support the entire weight of said welding torch on said workpiece whereby the torch need merely be guided along said workpiece in forming a weld.

2. Welding apparatus according to claim 1 in which said guide is a guide block, in which the wire bending means comprise a pair of bending rolls mounted on the guide block for adjustment relative to each other, and in which one of said bending rolls is secured to the guide block itself adjacent the discharge end of the bore and the other to a rocker arm pivotally secured to the guide block adjacent the discharge end of the bore whereby the radius of curvature imparted to the filler wire as it emerges from the bore may be varied.

3. A welding method comprising establishing a weld puddle on a workpiece by supplying heat thereto from a welding torch above the plane of said workpiece, continuously supplying a filler wire to the welding zone, supporting the entire weight of the torch by imparting a permanent curvature to the filler wire just prior to its contact with the workpiece so that it is permanently curved when it contacts the workpiece, guiding said filler wire so that it will engage the workpiece substantially at the edge of the weld puddle, and transmitting at least a portion of the reaction force imposed by the workpiece on the filler wire to the welding torch to support said torch on said workpiece and the remainder of said reaction force to the torch to propel the torch along said workpiece.

4. A welding method according to claim 3 which includes the step of varying the degree of curvature imparted to said filler wire to vary the spacing of the torch tip from the workpiece.

References Cited in the file of this patent

UNITED STATES PATENTS

| | | |
|---|---|---|
| 204,030 | Green | May 21, 1878 |
| 1,508,711 | Noble | Sept. 16, 1924 |
| 1,644,896 | Busekist | Oct. 11, 1927 |
| 2,125,781 | Harris | Aug. 2, 1938 |
| 2,182,575 | Baird | Dec. 5, 1939 |
| 2,280,879 | Anderson | Apr. 28, 1942 |
| 2,415,542 | Vawryk | Feb. 11, 1947 |
| 2,444,267 | Pereira | June 29, 1948 |

FOREIGN PATENTS

| | | |
|---|---|---|
| 548,645 | Great Britain | Oct. 9, 1942 |